United States Patent [19]
Proulx

[11] Patent Number: 5,708,412
[45] Date of Patent: *Jan. 13, 1998

[54] FLUID LEVEL AND TEMPERATURE MONITOR AND ALARM SYSTEM

[75] Inventor: Raymond A. Proulx, Barrington, N.H.

[73] Assignee: Hot Engine Alarm, Inc., Rochester, N.H.

[*] Notice: The term of this patent shall not extend beyond the expiration date of Pat. No. 5,521,581.

[21] Appl. No.: 650,808

[22] Filed: May 20, 1996

Related U.S. Application Data

[63] Continuation of Ser. No. 102,411, Aug. 5, 1993, Pat. No. 5,521,581.
[51] Int. Cl.$^6$ ........................................ F01P 11/14
[52] U.S. Cl. ........................ 340/449; 340/450; 123/41.4
[58] Field of Search ................................. 340/449, 450, 340/650, 685; 123/41.15, 41.12

[56] References Cited

U.S. PATENT DOCUMENTS

| | | | |
|---|---|---|---|
| 3,694,804 | 9/1972 | Hill | 340/59 |
| 3,832,982 | 9/1974 | Guehr | 123/41.15 |
| 4,110,740 | 8/1978 | Akita et al. | 340/620 |
| 4,461,342 | 7/1984 | Avrea | 165/104.23 |
| 4,475,498 | 10/1984 | Hurner | 123/198 DB |
| 4,628,302 | 12/1986 | Barr et al. | 340/620 |
| 4,753,289 | 6/1988 | Avrea | 165/104.23 |
| 4,790,369 | 12/1988 | Avrea | 165/104.32 |
| 4,833,441 | 5/1989 | Okada et al. | 340/450 |
| 4,881,494 | 11/1989 | Ishigami | 123/41.12 |
| 4,952,914 | 8/1990 | Mueller | 340/620 |
| 5,044,430 | 9/1991 | Avrea | 165/104.23 |
| 5,045,836 | 9/1991 | Nobles, Jr. | 340/450 |
| 5,109,219 | 4/1992 | Inglima | 340/506 |
| 5,201,284 | 4/1993 | Umehara | 123/41.15 |
| 5,521,581 | 5/1996 | Proulx | 340/449 |

Primary Examiner—John K. Peng
Assistant Examiner—Nathan J. Flynn
Attorney, Agent, or Firm—Brian L. Michaelis

[57] ABSTRACT

An electronic detection system monitoring coolant level and/or temperature of an internal combustion engine. A unit installed within the cab of a vehicle provides visual and audible warning if engine temperature rises above its normal hottest operating temperature and/or when coolant level drops below a selected level in the coolant reserve tank thereby preventing damage caused by overheating. The overheat detection system may comprise a heat sensor within a bolt which may be screwed directly into the engine head. An additional heat sensor positioned in the bottom radiator hose can be used in series with the engine head sensor. Associated circuitry is adjustable when installed to provide alarm activation when the temperature is a few degrees above the hottest normal engine operating temperature. If the engine starts to overheat, an LED lights up and an audible alarm sounds. A coolant level detector detects a drop in coolant level and comprises two probes installed horizontally in a side wall of the coolant reserve tank to provide a current path through the coolant present between the probes. Circuitry includes an appropriate timing means connected to the probes, and an LED indicator and/or audible alarm to warn the driver when the coolant level drops below a predetermined level. Additional coolant probes may be installed in the top radiator hose to warn the driver in the event of complete loss of coolant.

20 Claims, 4 Drawing Sheets

FLUID LEVEL AND TEMPERATURE MONITOR AND ALARM SYSTEM

This is a continuation of application Ser. No. 08/102,411 filed on Aug. 5, 1993 now U.S. Pat. No. 5,521,581 dated May 28, 1996.

BACKGROUND OF THE INVENTION

1. Field of the Invention

The present invention relates to electronic temperature and coolant level monitors suitable for use with an internal combustion engine.

2. Background Art

A number of devices have been disclosed in the art, which devices are intended to monitor temperature and coolant levels in vehicular engines, as disclosed, for example, in U.S. Pat. Nos. 4,672,920, 4,381,744, 3,832,982 and 3,694,804.

Such prior devices, however, generally exhibit one or more notable shortcomings. For example, at least some prior devices, designed to monitor car engine temperature so as to provide a warning when an excessive engine temperature is reached, fail to provide adequate warning before engine damage occurs. More specifically, in some prior devices the gages and light indicators in a vehicle are designed to indicate the heat of the coolant in the engine by communicating with a heat sensor that is in contact with the engine coolant. When the coolant overheats, the light may come on or the gage may move into its warning area but, if the driver doesn't notice it at that point, the coolant becomes hotter until it builds up a tremendous pressure and finally empties out of the engine by either bursting a hose or backing into a reserve tank. Once this happens the indicator no longer provides a true reading because of the sensor's loss of contact with the hot coolant and, as the driver continues to operate the vehicle, outside air cools the engine surface where the sensor is located. Meanwhile the center of the engine becomes even hotter. It is only when the engine gets to the point where it begins to vibrate that the driver first receives his or her indication that an adverse condition has occurred. Because the dash indicators may still be reading close to normal levels even at this point, the driver may continue to drive until the motor finally stops running.

Some prior devices have sought to overcome this problem by means of devices that monitor the pressure of the coolant, i.e., such that a pressure above a selected level indicates an overheated engine. This method may not work satisfactorily, however, in a cooling system that incorporates an overflow tank, as most vehicles now do, because the cooling system does not maintain constant pressure.

Other devices are designed to shut the engine down when it overheats. Aside from the fact that this may not be a safe warning method, the device may not trigger such action soon enough. Every individual engine operates at a different temperature which may be drastically affected by the age and condition of the engine and cooling system. Therefore, it is necessary for the factory preset temperature to be at a high enough setting to avoid triggering the shutdown device unnecessarily. Consequently, such a warning device may not be sensitive enough to shut the engine down soon enough before costly damage is done.

Further problems can be presented with devices that measure temperature of coolant fluid when a leak develops in the bottom hose of the coolant system, i.e. the intake hose of the system. Since the coolant system is intended to be maintained under a reduced pressure, a leak in this hose could result in air being absorbed into the coolant system and, more specifically, air being absorbed by the coolant. This will result in decreased heat transfer capabilities of the coolant which, in turn, can result in a temperature reading that does not accurately reflect the heat of the engine.

Further, in addressing the problem of monitoring the coolant level in an internal combustion engine, it should be noted that mechanical devices are usually not satisfactory for such purpose because of the constant motion of the coolant during operation of the vehicle. Such problem is particularly annoying when incorporating an audible alarm into the system.

Certain prior devices consist of a single probe or two probes placed within the cooling system and in particular in the radiator. The probes are designed to complete a circuit from the probe through the coolant to a ground outside of the system and so require a high electrical resistance to operate. If a leak develops and coolant leaves the radiator, the circuit is broken and the driver is given a warning by means of a light or alarm. Such a technique will not work effectively, particularly if there is a slow leak. Even though the general coolant level becomes low, the water pump is still pumping the coolant through the radiator and past the probe so that the sensor indicates that the level is normal when in fact the level is too low and the engine is starting to overheat. If and when substantially all of the coolant leaves the radiator, the warning may then come on, but at this point the engine has overheated and serious damage may have occurred. Moreover, since the sensor triggers on very high resistance, the presence of any coolant on the walls of the radiator may prevent the warning device from ever coming on.

SUMMARY OF THE INVENTION

The device in accordance with the present invention includes circuitry which is designed in such a way that it eliminates the problems associated with prior devices and provides an extremely sensitive and accurate monitoring system for engine overheating and coolant level detection in an internal combustion engine. One objective of the present invention is to provide an inexpensive means of monitoring engine heat and coolant levels which can be readily installed in a vehicular engine. In one particular embodiment, the invention provides for a relatively small, inexpensive unit which includes one heat sensor, or detector, to monitor the heat of the engine by monitoring the temperature of the engine head, or block, itself and a coolant level sensor, or detector, to monitor the level of coolant in the reserve tank of the cooling system. Another effective embodiment of the invention can further include, not only the above two sensors but also an additional heat sensor to monitor the temperature of the coolant in the bottom radiator hose of the engine and in a still further embodiment the invention can include an additional coolant level detector to measure the level of coolant in the radiator hose, e.g., the top radiator hose, so as to warn of a sudden total loss of coolant.

An important object of this invention is to provide such complete and accurate monitoring and notification of heat and coolant levels of an engine that no matter what situation might occur that could cause an engine to overheat, the driver will be warned immediately before any costly damage is done and, in many instances, even before the engine has a chance to overheat. If a situation occurs where one of the sensors discussed above does not monitor that particular situation, at least one of the other sensors will operate to monitor the situation so that the driver can be warned before any costly damage occurs. Such operation is important since even a short passage of time without warning could result in serious damage to an overheating engine.

Another object of the invention is to provide a monitoring system which can easily be adjusted to provide a warning at just a few degrees above the hottest normal operating temperature of a particular engine.

Another object of the invention is to monitor the coolant level in the reserve tank so as to provide well beforehand any situations which might eventually result in overheating of the engine.

Still another object of the invention is to allow the driver to distinguish between a serious overheat warning and a less urgent low coolant warning by providing different and distinctive audible sounds in each case.

A further object of this invention is to provide an inexpensive, retro-fit unit which can be purchased and installed in any vehicle with an internal combustion engine so as to provide an ability to adjust the temperature setting of the device to provide an accurate and early warning if the engine starts to overheat for any reason. Other objects and aspects of the invention are disclosed in the following description thereof.

It should be appreciated that parts of the invention may also be used to monitor the level of other liquids, including but not limited to water, windshield washer fluid, and other chemicals not necessarily associated with the automotive field. Parts of the probes in this invention, in particular the parts relating to the leak proof mounting of the probes, may have utility in fields other than monitoring engine fluid levels.

DETAILED DESCRIPTION OF THE INVENTION

It is helpful to describe the invention generally before presenting a more detailed description thereof. In accordance with one aspect of the invention, a device provides a coolant level and temperature monitor and alarm system that comprises a base unit which may be mounted within the cab of a vehicle having an internal combustion engine. The base unit is in communication with one or more heat sensors and coolant level detectors and includes means for transmitting and receiving electrical inputs and outputs to and from the heat sensor(s) and coolant level detector(s) as well as means for providing visual and/or audible indications of deviations from pre-determined values of the engine's temperature and/or coolant level. This system in particular comprises an appropriate means for adjusting the unit to monitor a temperature above (e.g. about five degrees above) the hottest normal operating temperature of the engine so as to effect an accurate and early warning if the engine starts to overheat. Such means may be a potentiometer, for example, which can be initially set to its lowest setting. The engine is then idled until an overheat alarm buzzer sounds. The potentiometer can then be adjusted until the alarm just stops, and the procedure repeated several times until the engine is fully warmed up and the alarm no longer comes on. If the engine starts to overheat for any reason, the temperature change monitored by the heat sensor will immediately be picked up by the circuit in the base unit so as to warn the driver of the situation so that the driver can take action to stop the engine before any costly damage is done.

The invention can comprise a heat sensor, such as an NTC thermistor positioned in a bolt, which is installed in the head of the engine by insertion thereof into a existing but unused bolt hole which may be available in the head or, if no bolt hole is available by removing an existing bolt in the head, preferably a bracket bolt, and screwing said bolt sensor in its place. Such sensor will be sensitive to the direct heat of the engine head itself rather than to the coolant circulating in the engine. Should the engine overheat for any reason, heat will quickly transfer to the bolt sensor on the head of the engine which communicates with appropriate circuitry in the base unit to warn the driver of the overheat condition. In such embodiment for monitoring the heat of the engine a thermocouple having appropriate circuitry associated therewith may be used instead of a thermistor.

The invention may include an additional heat sensor, e.g., a PTC thermistor or a heat sensitive switch, positioned in a fitting which may be installed in the bottom radiator hose. Such heat sensor is connected in series with the engine head thermistor to provide a more sensitive warning system, e.g., to detect overheating even faster, particularly in cold weather.

The invention in its preferred embodiment also comprises a coolant level sensor which includes two probes installed horizontally in a side wall of the coolant reserve tank so that they are submerged below the coolant when the tank is properly filled. These probes, for example, include brass rods wrapped with stainless steel windings. The probes communicate with circuitry, located in the base unit described above and mounted within the cab, to warn the driver if coolant is getting low due to evaporation thereof or to a leak in the cooling system. A second set of similar probes may also be installed in the radiator hose so as to communicate with duplicate circuitry in the base unit to warn the driver if a total sudden loss of coolant in the cooling system should occur.

Figure 4:
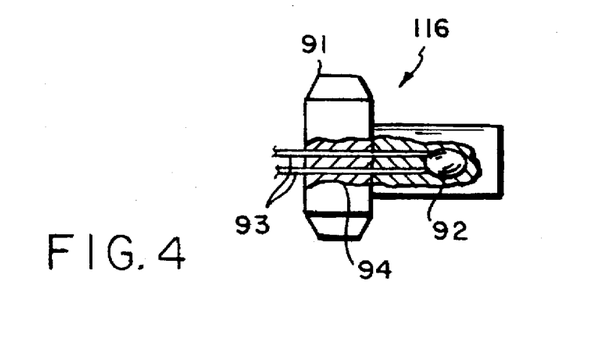
FIG. 4 is a cut-away sectional view of a heat sensor shown in FIGS. 3A and 3B which may be screwed into the engine head.
Figure 5:
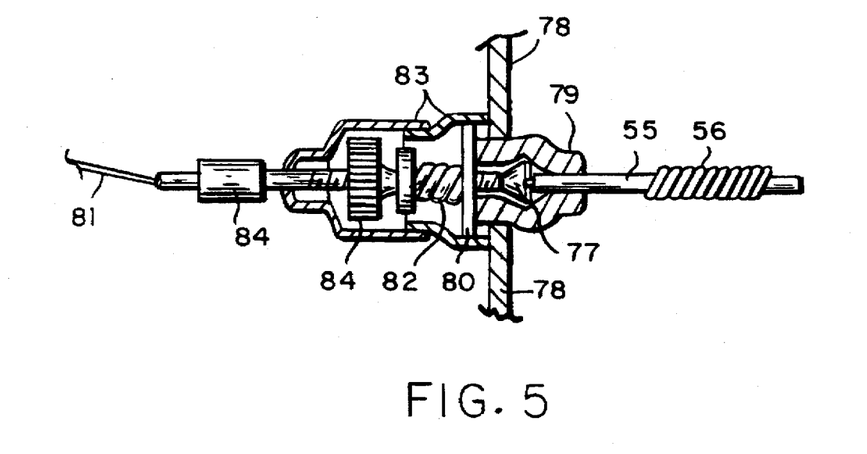
FIG. 5 is a cut-away sectional view of one of the coolant level sensor probes which may be installed in the reserve tank as shown in FIGS. 3A and 3B.
Figure 6:
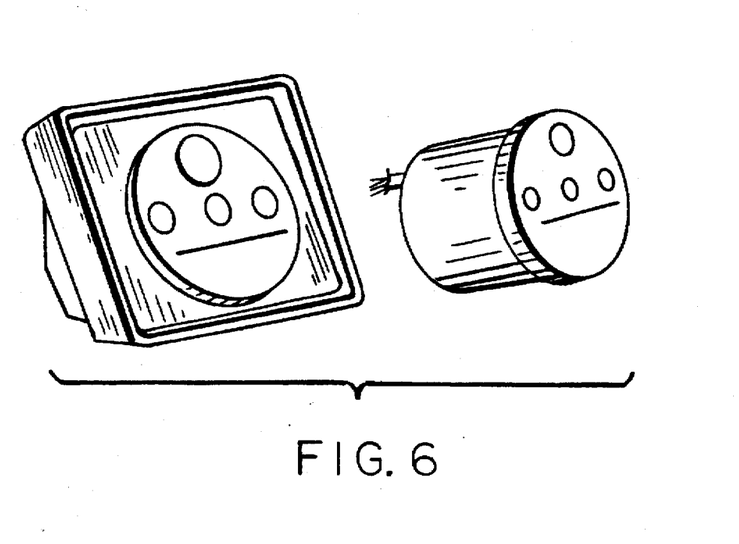
FIG. 6 shows perspective views of components used in a base unit for monitoring and displaying temperature and coolant levels in a vehicular engine.
Figure 7:
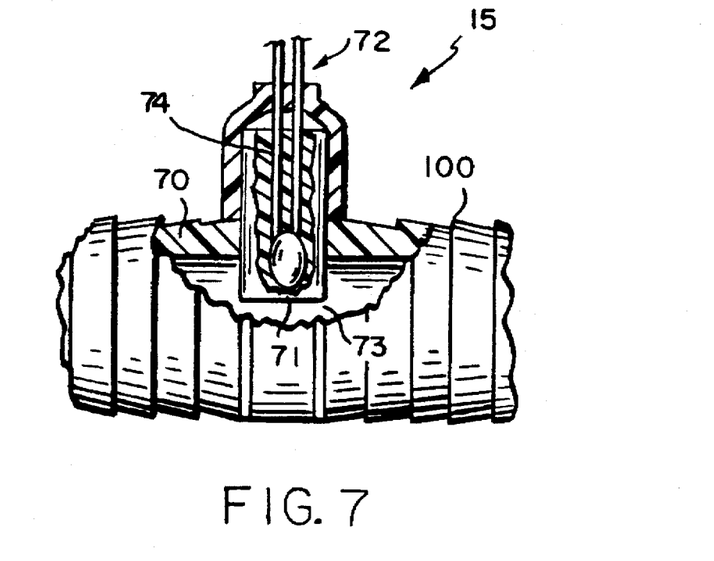
FIG. 7 is a cut-away sectional view of the heat sensor shown in FIG. 3B which may be installed in the bottom radiator hose.
Figure 8:
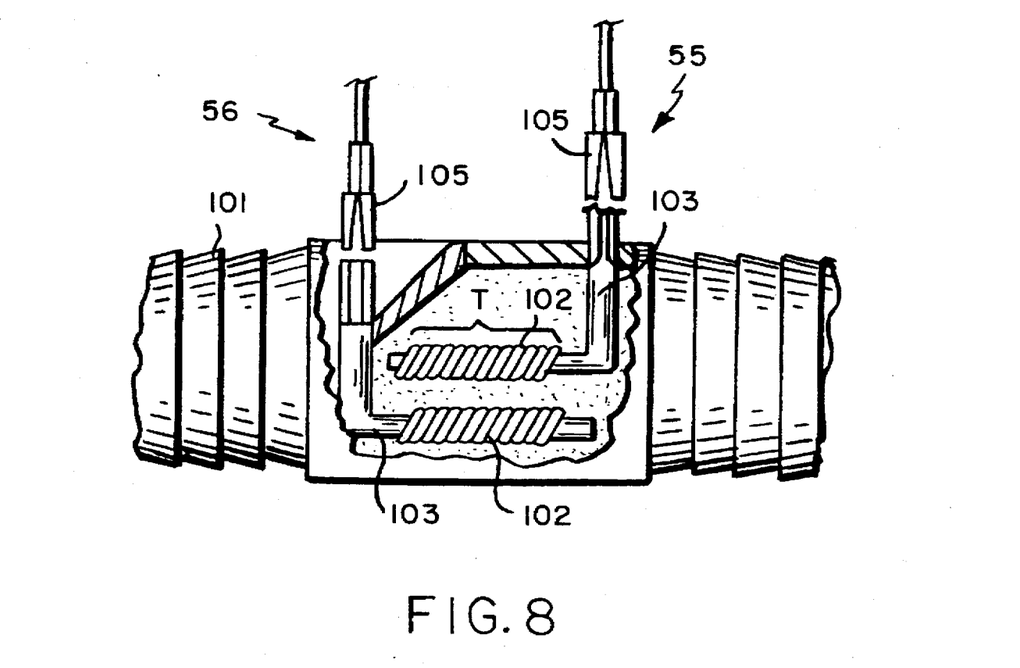
FIG. 8 is a cut-away sectional view of a coolant level sensor shown in FIG. 3B which may be installed in the top radiator hose as additional protection against a sudden complete loss of coolant.

As discussed above, the device of the invention comprises a base unit (such as shown in FIG. 6) which houses electronic circuits used in the invention, which unit may be mounted, for example, on the dash board of a vehicle: A heat sensor (such as shown in FIG. 4) may be installed in the engine head and a second heat sensor (such as shown in FIG. 7) may be installed in the bottom radiator hose. A coolant level sensor (such as shown in FIG. 5) may be installed in the coolant reserve tank of a vehicle and an additional coolant level sensor (such as shown in FIG. 8) may be installed in the top radiator hose for additional protection against a sudden complete loss of coolant. A more detailed description of the invention is described below.

Figure 1:
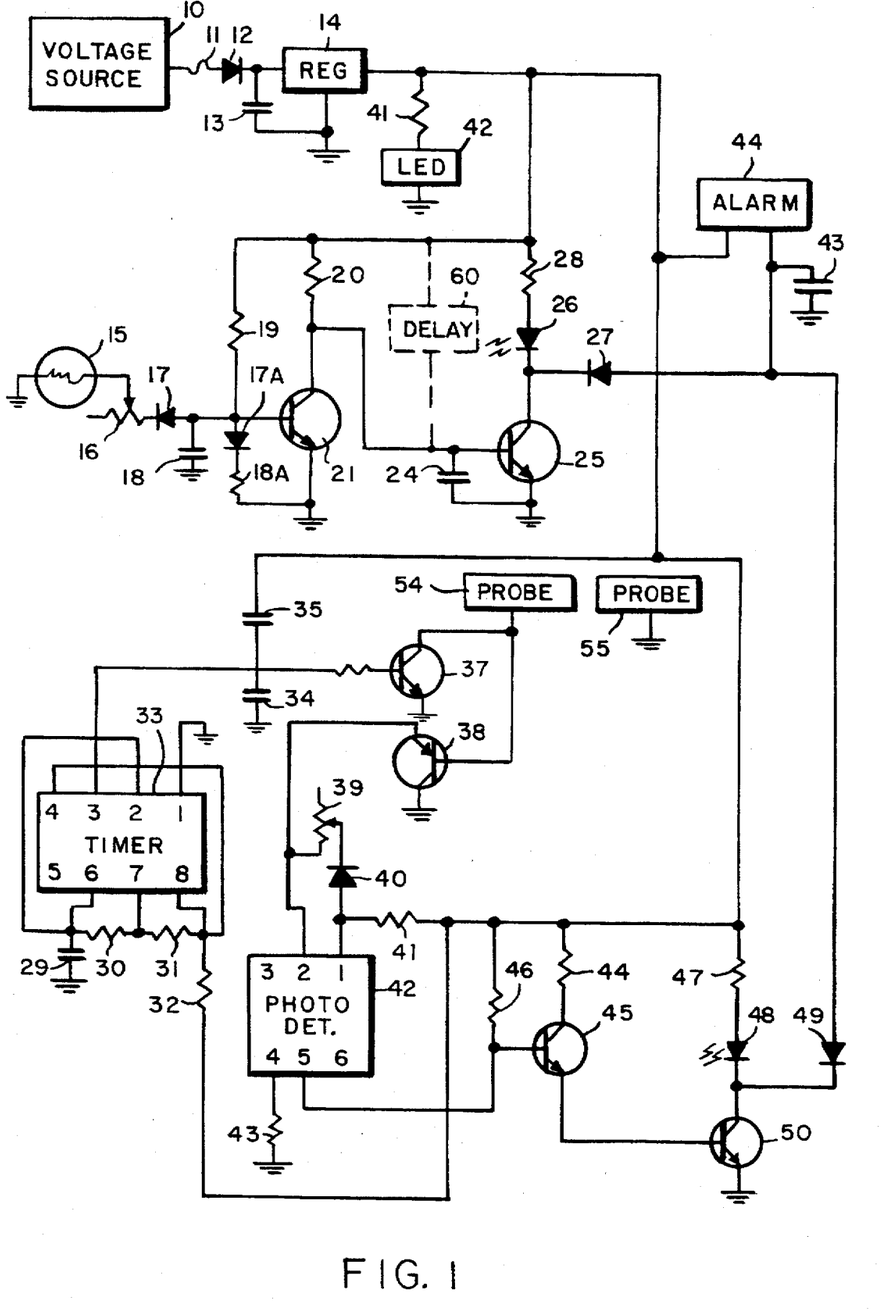
FIG. 1 is a schematic diagram illustrating circuitry for use in a device in accordance with the invention.

Referring now to FIG. 1, the device includes a nominal 12 volt power source 10 appropriately connected to a vehicle's fuse box, the unit being activated in the vehicle by turning the ignition key. A voltage, e.g., between 12 to 15 volts, is supplied via an in line fuse 11, a diode 12 and a voltage regulator 14, to a resistor 41 so as to produce a desired voltage to illuminate a light emitting diode (LED) 42. Diode 12 and electrolytic capacitor 13 connected to ground therefrom protect the circuit from possible external AC interference from the alternator of the vehicle. Voltage regulator 14, which can be an adjustable regulator, regulates the voltage to approximately 8 volts.

The voltage from voltage regulator 14 also is supplied through a resistor 19 to the base of transistor 21 which is then turned on and in turn turns off a transistor 25 so that under normal conditions a light emitting diode (LED) 26 and an audible alarm 44 are not activated. If the engine should start to overheat, a thermistor 15 mounted in the engine head changes its value and the voltage at the base of transistor 21 is in effect shorted to ground at a certain temperature predetermined by the adjustment of a potentiometer 16 so as to turn off transistor 21. The voltage supplied via resistor 20 to the base of transistor 25 turns on transistor 25 which turns on the LED 26 and the audible alarm buzzer 44, which is connected to transistor 25 via diode 27, immediately warning the vehicle operator that the engine is starting to overheat so that he or she can pull over and shut the engine off before costly damage has been done.

A specific embodiment of thermistor 15, as illustrated in FIG. 4, is installed in the engine head 101 (see FIGS. 3A and 3B) of the vehicle. Potentiometer 16 in FIG. 1, is used to set the temperature at which the alarm is triggered by thermistor 15. This setting can be determined after installation of the device by adjusting the potentiometer, which can be located at the base unit, to its lowest setting and idling the engine until the overheat alarm buzzer 44 sounds. The potentiometer is then turned up until the alarm just stops. Such procedure is then repeated successively several times as the engine idles until the engine is fully warmed up to its normal operating temperature and the alarm buzzer no longer comes on. Diode 17 operates as a circuit protector and diode 17, diode 17A at the base of transistor 21 and a resistor 18A serve as a temperature compensating circuit for transistors 21 and 25 which may be affected by variations in external temperature. Capacitors 18 and 43 eliminate external electronic noise interference which may affect buzzer 44. A capacitor 24 at the base of transistor 25 eliminates internal interference from a timer circuit 33, the operation of which is discussed below in connection with the coolant level detecting circuitry. Resistor 28 supplies voltage to LED 26, while diode 27 prevents LED 26 from turning on when a transistor 50, as discussed below, is turned on.

Figure 2A:
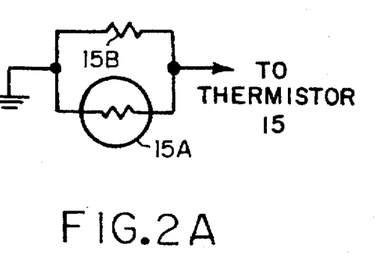
FIG. 2A is a schematic of further circuitry for use with the circuitry of FIG. 1.

It is found that the ambient temperature external to the engine car affects the operating temperature of the engine to a great extent, that is, the colder the outside temperature around the engine, the cooler the engine runs. Since it is recommended, as discussed above, that the alarm be calibrated for normal operation during warm weather, it may take longer for the bolt sensor to sense an overheating problem in cold weather. An additional temperature sensor 15A placed in the bottom radiator hose may be added as shown in FIG. 3B to create a more sensitive warning device in such cold weather. This sensor may be either a PTC thermistor or a temperature responsive heat switch having a resistor 15B in parallel therewith, as shown in FIG. 2A. The circuit of FIG. 2A is connected in series with thermistor 15. When the engine coolant is at a relatively low temperature due to cold ambient temperature, resistance is very low between resistor 15B and ground. When the coolant temperature rises the resistance becomes higher. The circuitry of FIG. 2A will cause the calibration which has been pre-set for the normal hottest operating temperature to be altered, thereby causing the alarm to trigger sooner when there is an overheat problem and the engine is operating at a lower temperature due to external cold temperature conditions.

In effect, the bolt sensor 15 and the additional coolant sensor 15A can work together to monitor the temperature of the coolant entering the engine and the heat of the engine head itself to provide a fast warning of an overheating problem no matter what the external ambient temperature at the engine is.

Referring now to probes 54 and 55 mounted in the coolant reserve tank (FIGS. 3A and 5) and to the coolant level detecting circuitry (FIG. 1) which causes an alarm to indicate when there is a loss of coolant, a first probe 54 is connected to the base of a transistor 38 and a second probe 55 is connected to ground, thereby providing an electrical current path between the probes through the coolant which is present between them, thereby turning on transistor 38. Generally, as long as probes 54 and 55 are submerged in coolant, transistor 38 is turned on, which in turn turns on pins 1 and 2 and pins 4 and 5 of a photodetector circuit 42, the output of which, at pin 5, turns off transistor 45 which in turn turns off transistor 50. Photodetector circuit is a well known integrated circuit which is sold under the designation, Optoisolator/Phototransistor IC, NTE 3040 by NTE Electronics Incorporated of Bloomfield, N.J.

It is found that, when using such a two probe system, if the coolant drops below the desired level at the probe locations in the reserve tank, the alarm circuit may not be activated because moisture in the residue of coolant which builds up along the walls of the tank between the probes may provide a conductive path which can produce a sufficient current, though at a relatively low value, to turn on transistor 38, even in the absence of coolant between the probes. Thus, an alarm may not be provided even though the coolant level has dropped below the probes.

In order to avoid such a situation, the potentiometer 39 is set to provide an alarm only at a relatively high current level, i.e., well above the current level which may occur because of the presence of moisture on the walls between the probes. Accordingly, when so set, photodetection circuit 42 will be turned on only at such a relatively high current level, i.e., when no coolant is present between the probes, even if some moisture is present on the walls. The probes are bi-metallic in structure, as discussed in more detail below.

It is further found that the electrical resistance of the coolant present between the probes varies with time and, since the transistor operates at a relatively high current level, the current level due to the varying resistance of the coolant may not always be sufficient to turn the transistor 38 on, even when coolant is present between the probes. Thus, a false alarm may occur even when there is adequate coolant in the reserve tank.

In order to avoid such problem, a second transistor 37 and a timer circuit 33 are used. The timer circuit is arranged so that the transistor 37 is periodically turned on for first selected periods of time during which time transistor 38 is turned on because transistor 37 then effectively shorts transistor 38 to ground. Under the timing operation transistor 37 is also periodically turned off for a second selected time period. It is found that, if the time periods during which the timer turns on transistor 37 are longer than the time periods during which it is turned off, e.g., approximately 3–4 times longer, as for example 3–4 seconds for turn-on and 1 second for turn-off, transistor 38 will remain turned on for the second selected time period when coolant is present between the probes, even if the varying resistance of the coolant is at a value which may not normally turn transistor 38 on. Accordingly, by using timer circuit 33 and transistor 37, false alarms due to the changing resistance of the coolant are avoided.

It is further found that, when coolant drops below the desired level, however, an alarm will still be activated during second selected time periods when the timer turns off transistor 37, thereby providing a periodic alarm warning during such times. Timer circuit 33 is of a well-known type, as made and sold, for example, under the description Timer/Oscillator IC NTE955M by NTE Electronics, Incorporated of Bloomfield, N.J. The time periods during which the timer turns transistor on and off are set by selecting the values of resistances 30 and 31 and of capacitance 29. Resistor 32 supplies current to timer 33 and capacitors 34 and 35 are used to eliminate external electronic noise interference problems.

It should be noted that when the engine is cold, the coolant in the reserve tank is at its lowest level. So it is likely that, if the coolant level is low due to evaporation or a very slow leak, the alarm will most likely sound and warn the operator when the engine is first started. In this way coolant may be added before the vehicle is placed into full operation. It should also be noted that frequent loss of coolant may indicate a leak which is thus readily detected before serious damage can be done.

As mentioned above, the transistor circuitry in the coolant level detecting circuitry allows for the use of a higher current to trigger photodetection circuit 42. Because of the presence of transistor 38, however, foaming or electrolysis of the coolant is prevented, even though such higher current is used. Because tolerance to probe resistances may not always be exact and may vary, potentiometer 39 is also used to calibrate the sensitivity of the circuit so as to differentiate between the conductivity of the stainless steel and brass materials used in probes 54 and 55. Diode 40 and resistor 43 serve as a temperature compensating circuit to compensate for variations in external temperature. Resistor 41 supplies voltage to pin 1 of circuit 42. Resistor 43 provides a path from pin 4 of circuit 42 to ground. Resistor 46 supplies voltage to the base of transistor 45. When transistor 45 is turned on, resistor 44 supplies voltage to the base of transistor 50. Resistor 47 supplies voltage to LED 48 to ground via transistor 50 when turned on. Diode 49 prevents LED 48 from being turned on when transistor 25 is on.

By duplicating the coolant level detecting circuitry, which is shown in FIG. 1, additional probes 56 and 57, shown in FIG. 3B and more specifically illustrated in FIG. 8, may be installed in the top radiator hose to provide an additional protection circuit to produce an alarm when coolant in the radiator hose is lost.

When an engine is first turned off, heat will temporarily continue to build up in the head for a few minutes before it proceeds to cool down. If the engine should be turned back on during this short period of time when the temperature is temporarily elevated, the alarm could be activated unnecessarily because the system is adjusted to produce an alarm if the temperature is a few degrees above the hottest normal operating temperature of the engine.

Figure 2B:
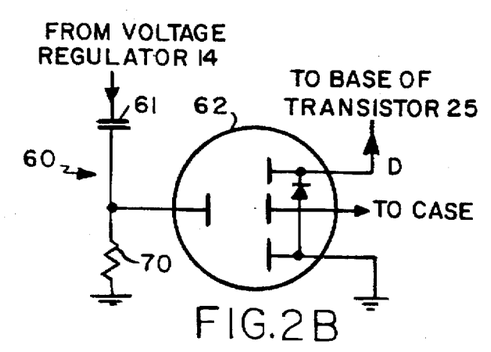
FIG. 2B is a schematic diagram illustrating a particular delay circuit which may be suitably included in the circuitry of FIG. 1.

In order to avoid such a problem, as an option, the delay circuit 60 of FIG. 2B may be utilized, particularly in vehicles with a cast iron head which may take longer to cool down after the engine is turned off. The delay circuit is connected from voltage regulator source 14 to the base of transistor 25, as shown in dashed lines in FIG. 1. When the circuit is turned on, electrolytic capacitor 61 automatically builds up a charge for a period of one to three minutes, determined by the value of resistor 70, so as to turn on field effect transistor 62 which in turn shuts off transistor 25 temporarily causing alarm 44 and LED 26 to remain off.

Although not normally necessary, a similar delay circuit connected between voltage regulator source 14 and the base of transistor 45, for example, may also be included in the coolant level detecting circuitry associated with the top radiator hose (FIG. 8), the delay circuit turning off transistor 45 and thereby turning off transistor 50 which in turn turns off LED 48 and alarm 44.

The heat sensor illustrated in FIG. 4 comprises an engine bracket mounting bolt 91, a thermistor 92 with leads attached to wiring 93. The cavity of the bolt is filled with a heat resistant epoxy 94. The sensor may be easily installed by removing an existing bracket bolt on the head of the engine and screwing the heat sensing unit bolt into its place. By means of the wiring 93, the sensor is in communication with the heat detecting circuit of FIG. 1. If the engine head starts to overheat the vehicle operator will be immediately warned by a light and an audible alarm sound to shut the engine off before any costly damage is done.

A similar heat sensor as shown in FIG. 7 may be used as the thermistor 15A in the bottom radiator hose to detect the temperature of the coolant therein, as discussed above. The resistor 15B is placed in parallel therewith so to prevent the overall resistance from exceeding a value which would prevent effective operation of the heat sensing circuitry. While such a resistor appears to be necessary when used with most currently available thermistors, it may be possible to design a thermistor in which the resistance thereof is effectively self-limiting, i.e., so that its resistance never exceeds a desired limit, in which case resistor 15B can be eliminated. Thermistor 15A can be replaced with a thermal, i.e. a heat responsive, switch to achieve the desired operation cold ambient temperatures, the switch operating in a discrete manner to change the resistance that is placed in series at that position in the heat sensing circuitry as opposed to the gradual change in resistance of a thermistor for that purpose.

The heat sensor as illustrated in FIG. 7 in a particular exemplary embodiment consists of a yellow brass, barbed fitting 70 with a thermistor 71 attached to wires 72 inserted in a yellow brass, closed-end, threaded pipe fitting 73. The cavity thereof may be filled with a heat resistant epoxy 74. This heat sensor is installed in the bottom radiator hose in communication with a heat detecting circuit as shown in FIG. 1 placed in the base unit, as illustrated in FIG. 3B. If the engine starts to overheat, the vehicle operator will be immediately warned by a light and an audible alarm sound to shut the engine off before any costly damage is done.

Figure 3A:
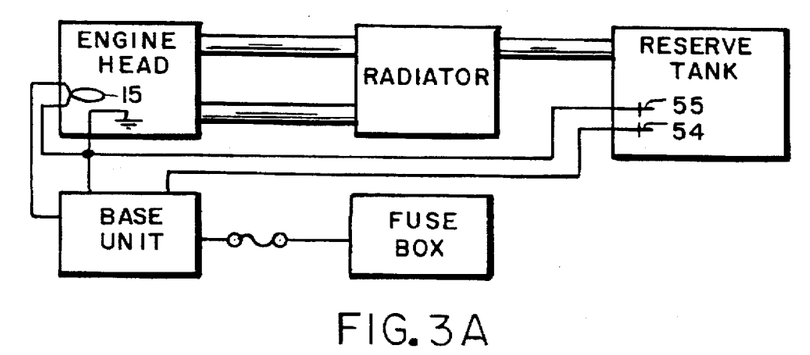
FIG. 3A is a block diagram illustrating one way in which the invention may be installed in a vehicle with an internal combustion engine using a thermistor or heat sensor installed in the engine head and a coolant level sensor installed in the reserve tank.
Figure 3B:
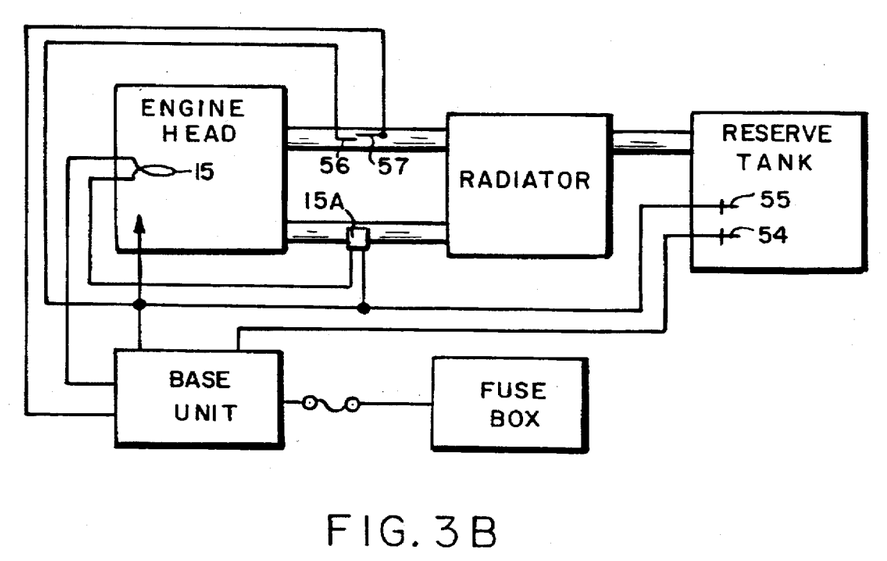
FIG. 3B is a block diagram illustrating another way in which the invention may be installed using thermistors or heat sensors installed in the engine head and bottom radiator hose and coolant level sensors installed in the reserve tank and top radiator hose.

The probe illustrated in FIG. 5 shows one of two identical probes which are installed horizontally in a side wall of the overflow, or reserve, tank at the desired minimum level of the coolant (FIG. 3A). In a preferred embodiment, for example, each probe is made of a 0.045 gage #308 stainless steel sleeve 56 around one end of a 2-inch 0.125 brass rod 55 which is attached to a 5/32 1¼ inch brass machine screw 77.

It has been found that the use of such a bi-metallic probe of stainless steel and brass provides the effective operation desired both when the coolant is relatively hot and when it is relatively cool. When the coolant liquid is at a reasonably heated level, e.g. on a hot day, the brass portion thereof primarily is used to provide the operation for detecting when coolant is not present between the probes, and will do so even if coolant residue is present on the walls, the brass being such as to prevent the triggering of an alarm solely due to the presence of such residue. When the coolant is at a reasonably cool level, e.g., on a cold day, however, the brass portion is such that it may produce a false alarm, even if fluid is present between the probes. Accordingly, to prevent such operation when the coolant is relatively cold, the stainless steel portion is primarily used to provide the desired operation, such material producing an alarm when no fluid is present, even if coolant residue is on the walls, but not producing an alarm when fluid is present.

To install the probes, two 5/16" holes are drilled in a horizontal plane approximately 2 inches, but not less than 1¾ inches, apart in a wall 78 of the reserve tank. A ⅞" piece of 5/32 rubber hose 79 is slid onto and over the threads of screw 77 as far as the head of the screw, and a standard 7/16" flat washer 80 and a 5/32" knurled nut 81 are then slid onto the screw 77. This assembly is then placed into one of the holes in the wall 78 leaving ¼" of hose visible on the outside of the wall. Nut 81 is finger tightened until rubber hose 79 slides over the head of screw 77 and is snug as illustrated. Next, nut 81 is unscrewed and placed over a half section of a standard hardware spring 82 is placed over screw 77 behind washer 80 and nut 81 is replaced. Nut 81 is then screwed tightly until spring 82 is completely compressed. The assembly is then covered with two pieces of shrink tubing 83 as illustrated and a solderless electrical terminal 84 is attached with wire 85 to the end of screw 77. A second probe is installed in the same manner in a second drilled hole and is attached to engine ground, as illustrated in FIGS. 3A and 3B. These probes are in communication with the coolant level detecting circuitry of the base unit. If the coolant level in the reserve tank drops below the desired minimum level, the vehicle operator will be immediately warned by a light and an audible alarm sound to check out the coolant system.

The coolant level probes illustrated in FIG. 8 comprise a barbed fitting 101 made from a heat resistant, non-conductive material, such as plastic or nylon. The probes are 0.125 brass rods 103 with 0.045 gage #308 stainless steel windings 102 and wires attachable to solderless electrical terminals 105. This unit may be installed in the top radiator hose and is in communication with a duplicate coolant detecting circuit (e.g., as illustrated in FIG. 1). If there is a sudden loss of substantially all coolant from the engine, the vehicle operator will be immediately warned by a light and an audible alarm sound to shut the engine off before any costly damage is done.

The foregoing description of the invention is merely illustrative of particular embodiments thereof, and it is understood that variations and modifications can be made by those in the art without departing from the scope or spirit of the invention. For example, while analog circuitry is disclosed, those in the art may use digital circuitry for the operations disclosed. Hence, the invention is not to be construed as limited to the particular embodiments described, except as defined by the appended claims.

What is claimed is:

1. A system for measuring characteristics of an internal combustion engine having an engine head, a radiator, and a first radiator hose and a second radiator hose transferring a coolant between said radiator and said internal combustion engine, comprising:

a heat sensor mounted in said engine head;

a second heat sensor mounted to sense temperature of coolant in said second radiator hose, said second heat sensor being electrically connected with said heat sensor in said engine head;

a heat control circuit responsive to said heat sensor and said second heat sensor producing a warning signal when said heat sensor and said second heat sensor measure a selected temperature, said heat control circuit being adjustable to set said selected temperature at a selected value above a hottest normal operating temperature level of said engine head, and at least one alarm responsive to said warning signal and being activated to provide an audible and/or visual alarm when said selected temperature is reached.

2. A system in accordance with claim 1 wherein said heat sensor is a thermistor positioned in said engine head and said heat control circuit is adjusted to set said selected temperature at approximately five degrees above the hottest normal operating temperature level of said internal combustion engine.

3. A system in accordance with claim 2 wherein said heat control circuit includes transistor circuitry connected to said at least one alarm providing an output activating said at least one alarm in response to an output of said heat control circuit, said heat control circuit including an adjustable potentiometer which is adjusted to supply a selected output to said transistor circuitry when said selected temperature is reached whereby said transistor circuitry responds thereto to activate said at least one alarm.

4. A system in accordance with claim 3 wherein said potentiometer is adjusted to a first value to produce a first output to activate said at least one alarm when said engine is turned on to an idling state and is further adjusted to a second level until said at least one alarm becomes de-activated, said potentiometer being further so adjusted an additional number of times to activate and de-activate said at least one alarm in the same manner as said engine continues to idle until the engine heats up to its hottest operating temperature level, a final adjustment of said potentiometer being such as to activate said at least one alarm at a selected temperature level above said hottest operating temperature level.

5. A system in accordance with claim 1 wherein said engine further includes a coolant reserve tank, said coolant reserve tank being connected to said radiator and configured for transfer of coolant between said coolant reserve tank and said radiator, said system further including:

at least one coolant level sensor mounted in said coolant reserve tank;

a coolant level circuit, said at least one coolant level sensor being connected to said coolant level circuit to provide a first current through said at least one coolant level sensor when a level of said coolant in said coolant reserve tank is at or above a selected coolant level, said coolant level circuit providing a second current through said at least one coolant level sensor when said coolant in said coolant reserve tank is below said selected coolant level, said first current being higher than said second current, said coolant level circuit connected to a timer circuit and said at least one alarm and responsive at least one sensor to activate said at least one alarm when coolant level in said coolant reserve tank is below said selected coolant level.

6. A system in accordance with claim 5 wherein said coolant level circuit includes timer circuitry connected to transistor circuitry preventing said timer circuitry from activating said at least one alarm so long as coolant level is above said selected coolant level.

7. A system in accordance with claim 6 wherein said timer circuitry turns said transistor circuitry on and off at a selected rate such that said transistor circuitry is turned on during a time period that is longer than a time period during which the transistor circuitry is turned off.

8. A system in accordance with claim 7 wherein said transistor circuitry is adjustable to operate when a resistance level in a current path through said coolant level sensor is above a selected resistance level.

9. A system in accordance with claim 1 wherein a resistor is connected in parallel with said second heat sensor.

10. A system in accordance with claim 1 wherein said second heat sensor is a thermistor.

11. A system in accordance with claim 1 wherein said second heat sensor is a heat responsive switch.

12. A system in accordance with claim 1 wherein said heat control circuit further includes a time delay circuit preventing said at least one alarm from being activated during a selected time period.

13. A system in accordance with claims 1, or 5 and further including:

an additional coolant level sensor mounted in the coolant in one of said first and said second radiator hose;

further including a second coolant level circuit, said additional coolant level sensor being connected to said second coolant level circuit.

14. A system in accordance with claim 13 wherein said first radiator hose is a top radiator hose and said additional coolant level sensor is mounted in said top radiator hose of the engine.

15. A system in accordance with claim 5 wherein said at least one coolant level sensor includes at least one probe configured to be immersed in a liquid to sense the presence or absence of said, liquid said probe comprising a threaded portion;

a rod of a first metallic material attached to said threaded portion;

a sleeve of a second metallic material positioned around an end of said rod distal to said threaded portion; and an electric terminal attachable to said threaded portion.

16. A system in accordance with claim 15 wherein said first material is brass and said second material is stainless steel.

17. A system in accordance with claim 13 wherein said additional coolant level sensor includes at least one probe configured to be immersed in a liquid to sense the presence or absence of said liquid, said probe comprising a first portion;

a rod of first metallic material attached to said first portion;

a sleeve of second metallic material positioned around an end of said rod distal to said first portion; and an electric terminal attachable to said first portion.

18. A system in accordance with claim 17 wherein said first material is brass and said second material is stainless steel.

19. A system for measuring characteristics of an internal combustion engine having a radiator and a radiator hose connected therebetween, said engine further including a coolant reserve tank, said coolant reserve tank being connected to said radiator and configured to transfer coolant between said coolant reserve tank and said radiator, said system further including:

at least one coolant level sensor mounted to sense level of coolant in said coolant reserve tank;

a coolant level circuit, said at least one coolant level sensor being connected to said coolant level circuit which senses a first current through said at least one coolant level sensor when said level of said coolant in said coolant reserve tank is at or above a selected coolant level, said coolant level circuit sensing a second current through said at least one coolant level sensor when said coolant in said coolant reserve tank is below said selected coolant level, said first current being higher than said second current, said coolant level circuit connected to at least one alarm and responsive to said at least one coolant level sensor to activate said at least one alarm when coolant level in said coolant reserve tank is below said selected coolant level;

further including timer circuitry in said coolant level circuit connected to transistor circuitry configured to prevent said timer circuitry from activating said at least one alarm so long as coolant level is above said selected coolant level;

wherein said timer circuitry turns said transistor circuitry on and off at a selected rate such that said transistor circuitry is turned on during a time period that is longer than a time period during which the transistor circuitry is turned off.

20. A system in accordance with claim 19 wherein said transistor circuitry is adjustable to operate when a resistance level in a current path through said coolant level sensor is above a selected resistance level.

* * * * *